(12) United States Patent
Abraham

(10) Patent No.: US 9,727,094 B1
(45) Date of Patent: Aug. 8, 2017

(54) WINDOW BUTTON ASSEMBLY

(71) Applicant: Apple Inc., Cupertino, CA (US)

(72) Inventor: Euan S. Abraham, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/494,153

(22) Filed: Sep. 23, 2014

Related U.S. Application Data

(60) Provisional application No. 61/884,079, filed on Sep. 29, 2013.

(51) Int. Cl.
  *H05K 7/14* (2006.01)
  *H05K 7/00* (2006.01)
  *G06F 1/16* (2006.01)

(52) U.S. Cl.
  CPC ............ *G06F 1/169* (2013.01); *G06F 1/1616* (2013.01)

(58) Field of Classification Search
  CPC .. H01R 12/7082; H01R 12/721; H01R 12/73; H01R 13/6582; H01R 24/20; H01R 24/66; H01R 13/447; G06F 1/1616; G06F 1/1658; G06F 1/1684; G06F 1/1601; G06F 1/181; G06F 1/16; G06F 1/182; G06F 1/189; G06F 2200/1631; Y10T 29/49002; Y10T 29/49105; Y10T 403/32557; H01H 11/00; H01H 13/70; H05K 5/0247; H05K 7/00
  USPC ............ 361/679.02, 679.18, 679.26, 679.27, 361/679.09; 312/223.1, 223.2
  See application file for complete search history.

(56) References Cited

U.S. PATENT DOCUMENTS

| | | | | |
|---|---|---|---|---|
| 7,244,898 | B2* | 7/2007 | Kim ...................... | H01H 13/83 200/314 |
| 7,432,460 | B2* | 10/2008 | Clegg .................... | H01H 13/70 200/314 |
| 8,294,047 | B2* | 10/2012 | Westerman ............. | G06F 3/017 178/18.01 |
| 8,729,414 | B2* | 5/2014 | Mittleman ............. | H01H 13/79 200/5 A |
| 8,982,062 | B2* | 3/2015 | Bos ...................... | G06F 3/03547 345/173 |
| 9,001,503 | B1* | 4/2015 | Hibino ................. | H05K 1/0306 361/679.01 |
| 2003/0006858 | A1* | 1/2003 | Ma ...................... | H01H 59/0009 333/101 |
| 2006/0181517 | A1* | 8/2006 | Zadesky ............... | G06F 1/1613 345/173 |
| 2009/0207152 | A1* | 8/2009 | Nakamura .......... | G06F 3/03547 345/174 |
| 2010/0079404 | A1* | 4/2010 | Degner ............... | G06F 3/03547 345/174 |

(Continued)

*Primary Examiner* — Courtney Smith
*Assistant Examiner* — Michael Matey
(74) *Attorney, Agent, or Firm* — Brownstein Hyatt Farber Schreck, LLP

(57) ABSTRACT

A window button assembly is connected to an enclosure of an electronic device. The window button assembly can include a button plank and a switch component positioned underneath the button plank such that sufficient deflection of the button plank activates the switch component. A component may be included in the window button assembly. The component can be in communication with the switch component, and activation of the switch component can initiate an action by the component.

22 Claims, 12 Drawing Sheets

(56) References Cited

U.S. PATENT DOCUMENTS

| | | | |
|---|---|---|---|
| 2010/0237738 A1* | 9/2010 | Smith | G11C 23/00 310/309 |
| 2012/0044177 A1* | 2/2012 | Ohta | A63F 13/06 345/173 |
| 2012/0165073 A1* | 6/2012 | Griffin | H04B 1/38 455/566 |
| 2012/0287587 A1* | 11/2012 | Los | H05K 1/147 361/749 |
| 2013/0162515 A1* | 6/2013 | Prociw | G06F 1/1616 345/156 |
| 2014/0061466 A1* | 3/2014 | Chien | G01J 1/0403 250/338.1 |
| 2014/0168924 A1* | 6/2014 | Kuo | H01H 13/50 361/781 |

* cited by examiner

WINDOW BUTTON ASSEMBLY

CROSS-REFERENCE TO RELATED APPLICATION

This application claims the benefit under 35 U.S.C. §119 (e) of U.S. Provisional Patent Application No. 61/884,079, filed Sep. 29, 2013, entitled "Window Button Assembly," the entirety of which is incorporated herein by reference as if fully disclosed herein.

TECHNICAL FIELD

The present invention relates generally to electronic devices, and more specifically to input/output devices for electronic devices.

BACKGROUND

Computers and other electronic devices typically include one or more input devices, such as mice, keyboards, joysticks, button assemblies, and switch components so a user can more easily interact with the device in question. Similarly, electronic devices typically include one or more output devices, such as displays, status indicator lights, and communication antennas so a user can more readily ascertain the status of the associated electronic device and easily interact with other devices and networks nearby. Often, these input/output devices may be integrated with or into the associated electronic device. For example, a laptop computer may include a keyboard or communication antenna operably connected to its internal systems and housed within its enclosure. Similarly, a laptop computer may also include a track pad or other motion-based input device that may also be integrated with the enclosure.

In some instances, it may be desirable to reduce the size of some computers or other electronic devices. For example, smart phones and laptops may be designed to be as small and light as possible. As electronic devices become smaller, space is at a premium. Many input/output devices, however, may consume a substantial amount of interior space, surface space, or both of the associated electronic device. Additionally, the appearance of many input components may be separate or distinguished from the enclosure of the electronic device or the enclosure of the input device. This may detract from a uniform appearance of the device and may reduce the effectiveness or appeal of the device. Thus, it would be desirable to be able to provide an electronic device with an improved button assembly that consumes minimal space and enhances the uniform appearance of the device.

SUMMARY

Some embodiments described herein include an electronic device having a window button assembly covering and/or engaging various input/output devices. The electronic device may include a display, processing element(s) in communication with the display, an enclosure connected to the display, and input/output devices in communication with the processing element(s) and connected to the enclosure. The window button assembly is designed to hide and/or activate various input/output devices with a button plank. For example, in one embodiment the window button assembly is configured to hide the communication antenna and switch component under the button plank, with the button plank designed to deflect sufficiently to activate the switch component. The communication antenna may be in communication with the switch component. A feedback component can be in communication with the switch component and/or an input/output device (e.g., the communication antenna). As one example, the feedback component may be a status indicator light.

In some embodiments, the button plank may operate as a cantilever. A portion of the button plank may be cantilevered over a switch cavity formed underneath the button plank and within the window button assembly that houses various input/output devices, such as a switch component and a status indicator light. The button plank may reciprocate from an unactuated position to an actuated position with respect to the enclosure. In the unactuated position, the button plank is in a relaxed position and may be sufficiently flush with the enclosure. In the actuated position, the window button assembly may be pressed by a user and the portion of the button plank that is cantilevered over the switch cavity may be depressed sub-flush of the enclosure sufficiently to activate the switch component underneath the button plank. Activation of the switch component can initiate an action by a component in communication with the switch component. For example, in one embodiment the component can be a communication antenna and once the switch component is activated, the communication antenna may power on and the feedback component may indicate the status of the communication antenna and/or device pairing.

In other embodiments, the button plank is configured to operate as a double cantilevered beam with both ends of the button plank attached to the enclosure. The button plank may reciprocate from an unactuated position to an actuated position with respect to the enclosure. In the unactuated position, the button plank is in a relaxed position and may be sufficiently flush with the enclosure. In the actuated position, the window button assembly may be pressed by a user and the button plank may deflect inward sub-flush of the enclosure sufficiently to activate the switch component. Activation of the switch component can initiate an action by a component in communication with the switch component. For example, in one embodiment the component can be a communication antenna and once the switch component is activated, the communication antenna may power on and the feedback component may indicate the status of the communication antenna and/or device pairing.

In addition to functioning as described above, the window button assembly may have an appearance that substantially streamlines the look of the enclosure.

DETAILED DESCRIPTION

Some embodiments described herein may take the form of a window button assembly that may provide input to an associated electronic device, such as a computing device. As used herein, the terms "electronic device" and "computing device" are generally interchangeable. Examples of electronic devices include personal computers; tablet computing devices; smart phones; cellular telephones; televisions; media player, or other audiovisual components; headphones and earpiece devices; mice; keyboards; remote controllers; global position system (GPS) devices; gaming devices; hybrid devices that include the functionality of multiple devices of this type, and so forth. The window button assembly enables a user to provide inputs to the electronic device, as well as providing feedback (such as visual or haptic) to the user. In some implementations, the window button assembly may replace one or more switches or other components of a conventional electronic device, or the window button assembly may be used in addition to a conventional switch or like component to provide expanded input/output functionality. As another example, the window button assembly may be used to streamline the cosmetics of the electronic device by covering various input/output devices, such as communication antennas, light-emitting diodes, feedback devices, status indicator lights and so forth.

As one example, the window button assembly may include a button plank, a communication antenna, a switch component, and a status indicator light. Pressing the button plank may either power the electronic device on or off or initiate pairing communication with another device through the communication antenna. To turn the electronic device on or off, or to initiate pairing communication with another device, a region of the button plank may be pressed and bent sufficiently to activate a switch component hidden behind the button plank and within the window button assembly. The corresponding switch action may then power the electronic device on or off or initiate pairing communication with another device. Optionally, an associated status indicator light positioned behind the button plank can be initiated (e.g., turned on) such that it that is visible to the user from the exterior of the button plank. The switch component may be activated by specific surface features of the enclosure that are hidden behind the window button assembly. That is, these features may depress the switch or otherwise activate it. The enclosure features may also form mechanical stops to prevent the window button assembly from over-deflecting and possibly breaking.

Figure 1:
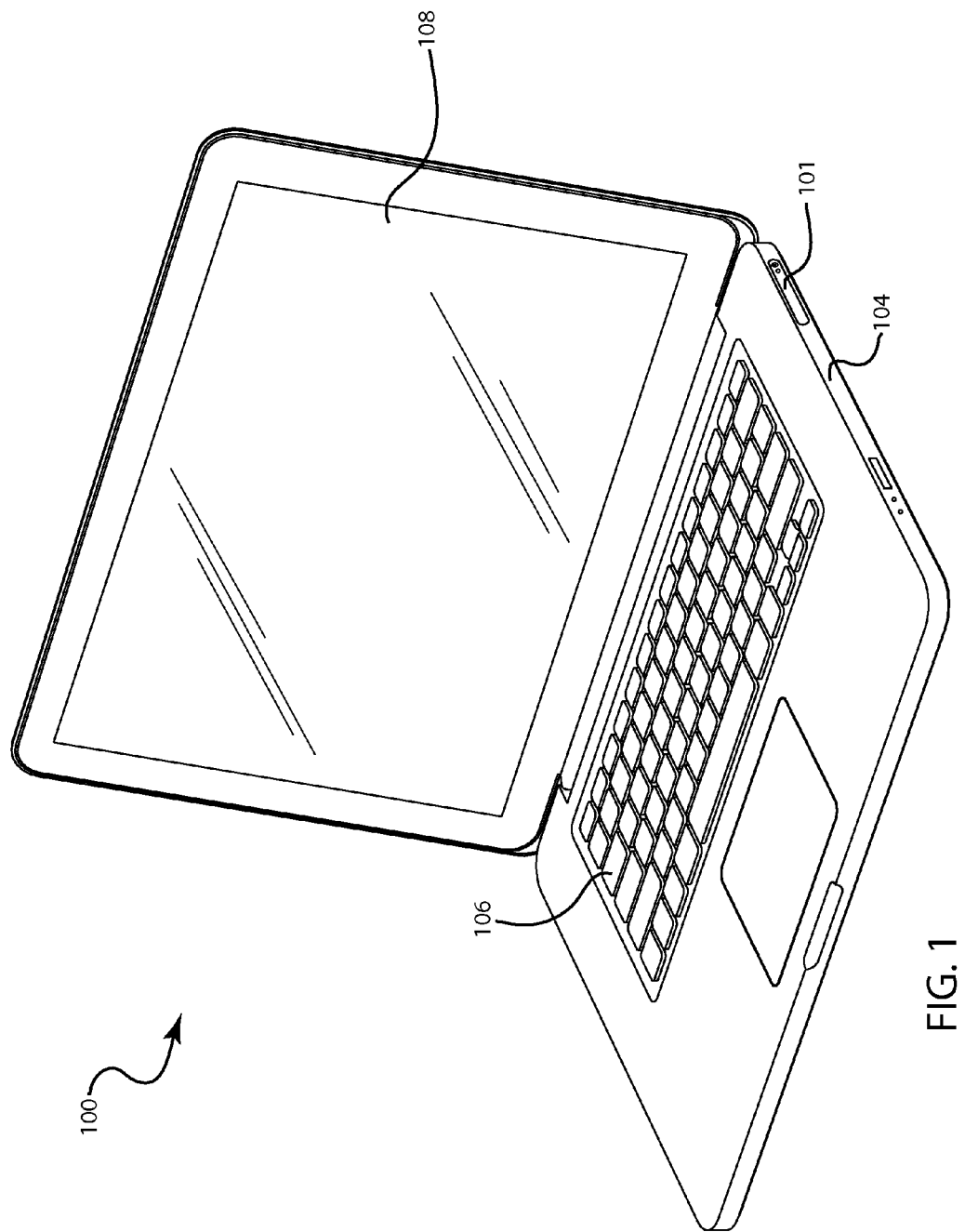
FIG. 1 is a perspective view of an electronic device incorporating a sample window button assembly.
Figure 2:
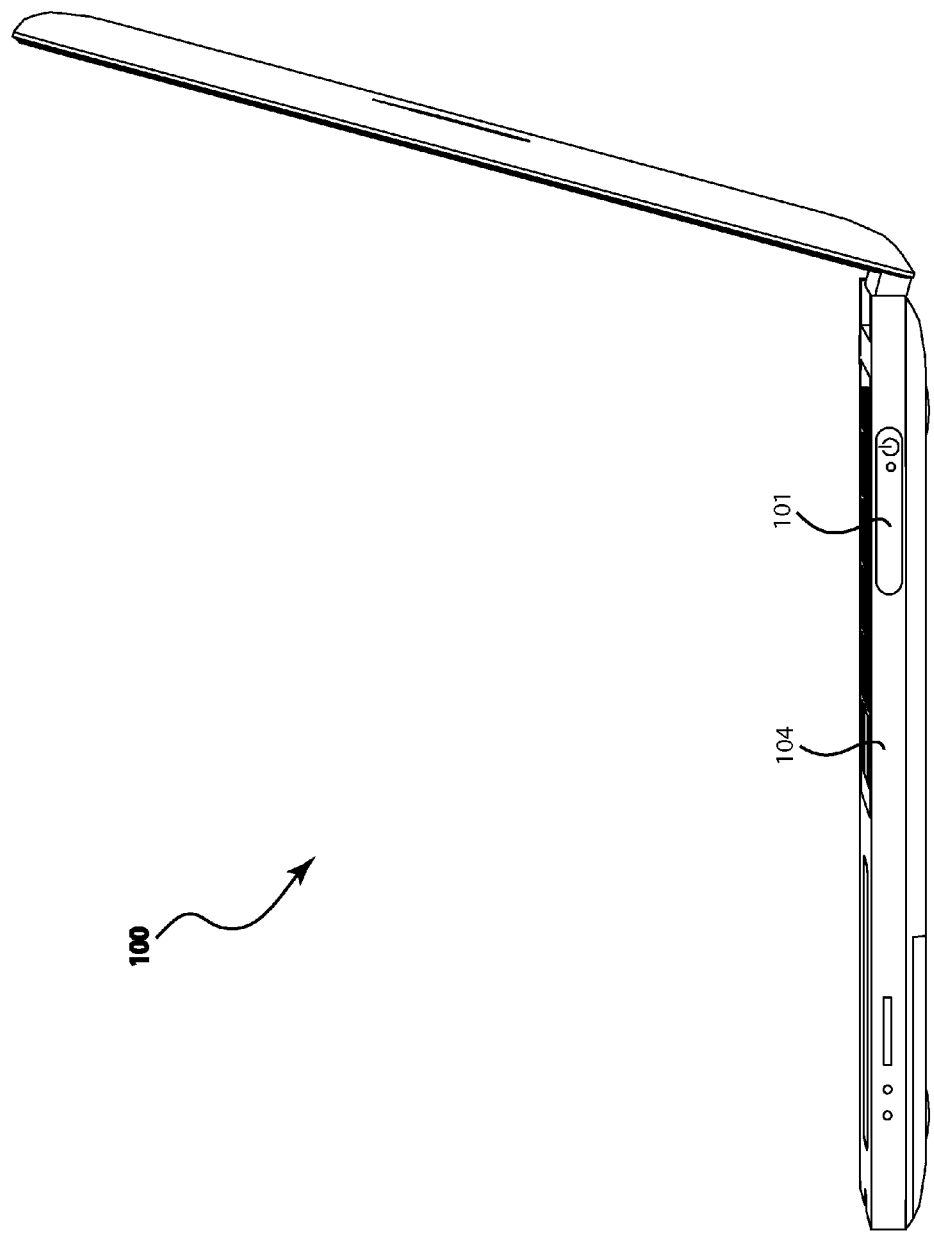
FIG. 2 is a side elevation view of the electronic device incorporating the sample window button assembly in a first configuration.

An illustrative window button assembly will now be discussed in more detail. FIG. 1 is a perspective view of an electronic device incorporating a window button assembly 101. With reference to FIGS. 1 and 2, the electronic device 100 may include the window button assembly 101, an enclosure 104 at least partially surrounding the window button assembly 101, a keyboard 106, and a display 108. Although shown schematically as being formed on the side of the electronic device 100 in FIG. 1, the window button assembly 101 may be formed generally on any suitable portion of the electronic device 100. For example, the window button assembly 101 may be formed on the side of the electronic device 100 or may also be located on the top face, rear face, or other portion of the electronic device 100. In some embodiments, the window button assembly 101 may be placed strategically in an inconspicuous location within the enclosure 104 or other portions of the electronic device 100 so the user is required to manipulate the electronic device 100 to operate the window button assembly 101. This may allow the user to operate the electronic device 100 under normal conditions without interference or distraction from the window button assembly 101. In other embodiments, the window button assembly 101 may be positioned ergonomically to allow the user to operate the window button assembly 101 without manipulating the electronic device 100.

The electronic device 100 may be substantially any type of computer or electronic device, such as, but not limited to, a desktop, a laptop, a tablet, a portable gaming device, a router, a mouse, a keyboard, a remote controller, a headphone or earpiece device, a television, media player, or other audio/visual component, a global positioning system (GPS) device, and/or a mobile computing device (e.g., a smartphone). The electronic device 100 may also be any hybrid device that combines the functionality of multiple conventional devices, such as a cellular telephone that includes media player functionality, a gaming device that includes a wireless communications capability, etc. Based on the specific configuration of the electronic device 100, one or more elements as illustrated in FIG. 1 may be omitted. As one example, in instances where the electronic device 100 is a tablet, the keyboard 106 may be omitted. As another example, in instances where the electronic device 100 is a mouse, the display 108 may be omitted. In the embodiment shown in FIG. 1, the electronic device 100 is a laptop computer including an enclosure 104 operably connected to the keyboard 106 and a display 108 or upper portion operably connected to the display 108. The two portions may be rotatably connected to each other.

Figure 4:
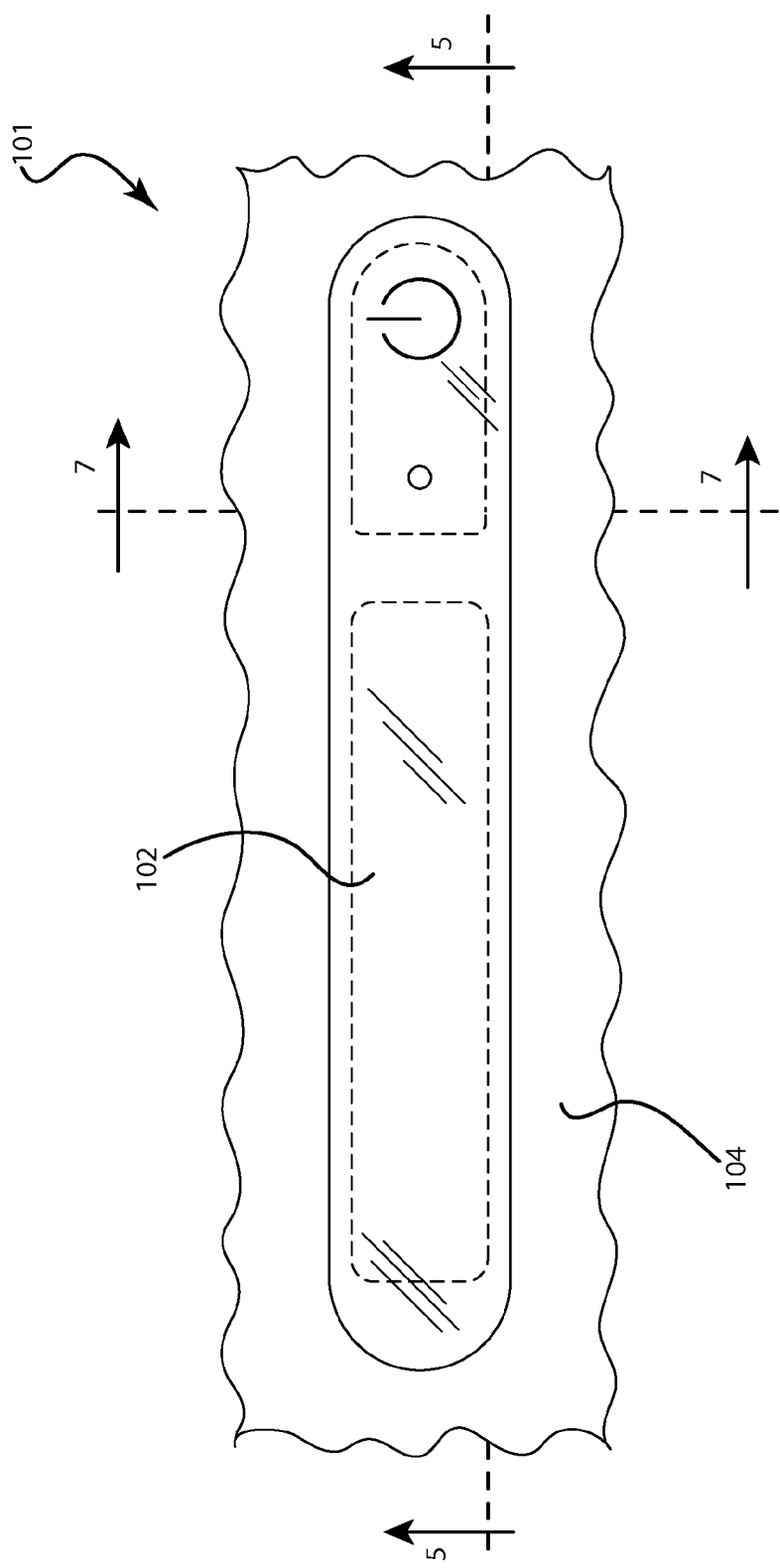
FIG. 4 is an enlarged side elevation view of FIG. 2 focusing on the sample window button assembly.

The window button assembly 101 may comprise a button plank 102 shaped generally as an elongated bar extending across a portion of a length or width of the enclosure 104, as shown to best effect in FIG. 4. In some embodiments, the button plank 102 may be shaped generally as a rectangle with square edges. In other embodiments, the button plank 102 may be shaped generally as a rectangle with round edges (e.g., a lozenge). Notwithstanding the foregoing, the shape of the button plank 102 may vary in alternate embodiments and need not be rectangular.

In some embodiments, the button plank 102 may also have a cosmetic treatment (e.g., paint or etching) carrying the power icon or graphic notification giving the user the cue to press in a specific location. A light-emitting diode positioned behind the button plank 102 may be illuminated to give the user a visual cue to press the plank in a specific location to actuate functionality. Similarly, the button plank 102 may have a surface treatment (e.g., depressions, scuffing, etching, ridges, etc.) to indicate tactilely to the user to press in a specific location. The button plank 102 may be made of any material, such as glass, that will allow the button plank 102 to operate as described in more detail below. In some embodiments, the button plank 102 may be opaque in appearance to prevent the user from seeing anything other than the top surface of the button plank 102.

The top surface of the button plank 102 may also be flush with the enclosure 104. This may allow the electronic device 100 and the window button assembly 101 to have a substantially uniform and seamless appearance. In some embodiments, the button plank 102 may be formed integrally with the enclosure 104.

Figure 3:
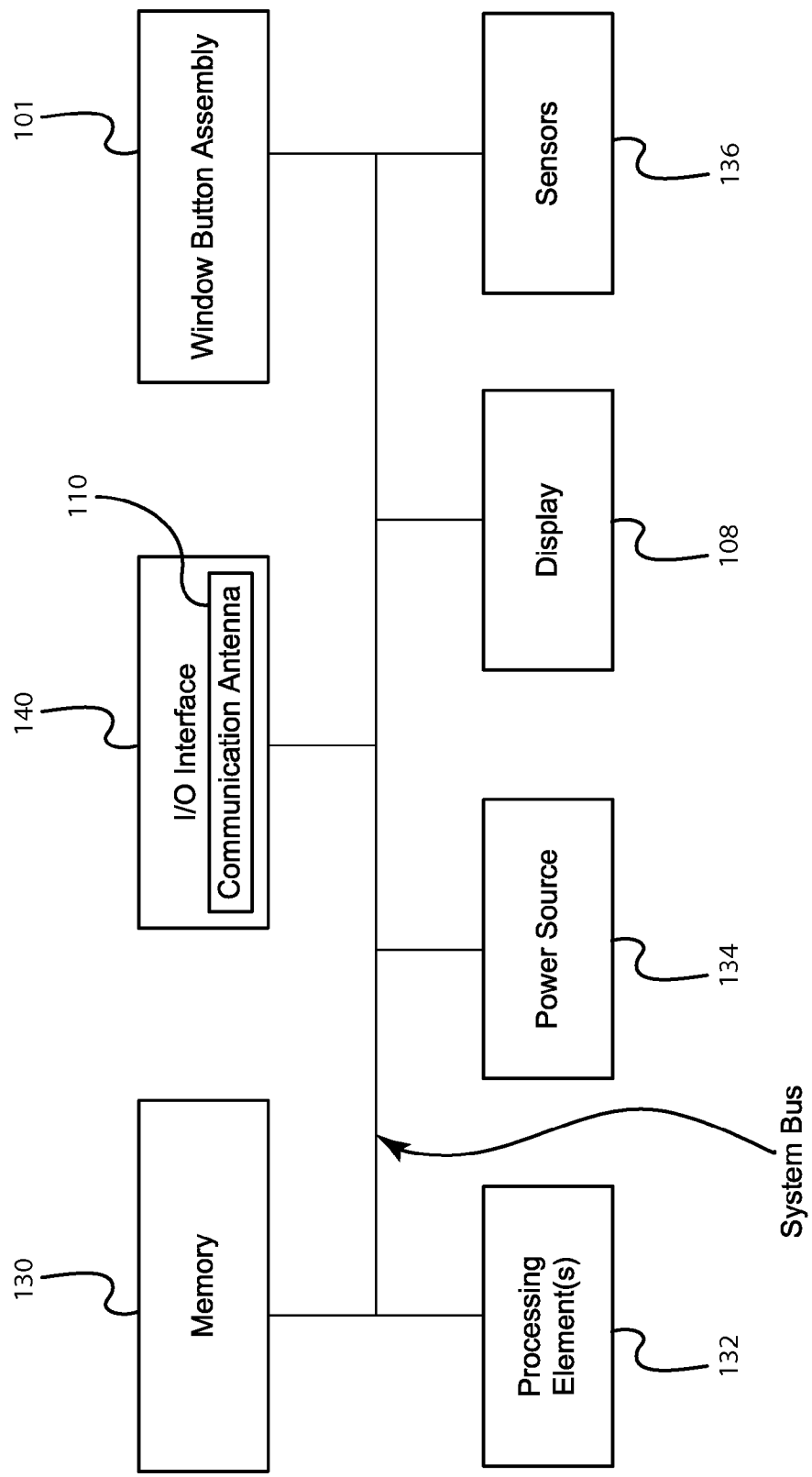
FIG. 3 is a simplified block diagram of the electronic device of FIG. 1.

The window button assembly 101 may be in communication with a number of components of the electronic device 100. FIG. 3 is a simplified block diagram of the electronic device 100. As shown in FIG. 3, the electronic device 100 may include a processing element(s) 132, one or more sensors 136, a power source 134, and/or one or more memory component(s) 130. The components of the electronic device 100 may be in communication with one another through one or more system buses 138, printed circuit board traces, wireless signals, or the like.

The memory component(s) 130 may store electronic data that may be utilized by the electronic device 100. For example, the memory component(s) 130 may store electrical data or content, such as audio files, video files, document files, and so on, corresponding to various applications. The memory component(s) 130 may be, for instance, non-volatile storage, a magnetic storage medium, optical storage medium, magneto-optical storage medium, read-only memory, random access memory, erasable programmable memory, flash memory, or a combination of one or more types of memory components.

The processing element(s) 132 may be substantially any computing device capable of processing, receiving, and/or transmitting instructions. For example, the processing element(s) 132 may be one or more microprocessors or microcomputers. Additionally, the processing element(s) 132 may include more than one processing component. For example, select components of the electronic device 100 may be controlled by a first processor and other components of the electronic device 100 may be controlled by a second processor, wherein the first and second processors may or may not be in communication with each other. The processing element(s) 132 may be used to control the operation of the electronic device 100. For instance, the processing element(s) 132 and memory component(s) 130 may be used to run one or more software applications on the electronic device 100. Sample software applications include, but are not limited to, internet browsing applications, email applications, media playback applications, operating system functions, and the like. Furthermore, the processing element(s) 132 and memory component(s) 130 may be used in implementing suitable communication protocols, including internet protocols, wireless local area network protocols (e.g., IEEE 802.11 protocols), short-range wireless communication link protocols (e.g., Bluetooth), cellular telephone communication protocols, etc.

The electronic device 100 may also include one or more sensors 136. The sensors 136 may be incorporated into the window button assembly 101 and/or may be in communication therewith. For instance, the window button assembly 101 may include one or more force sensors, strain gauges, capacitive sensors, or the like that may detect inputs to the window button assembly 101 from a user.

The enclosure 104 may be formed of any suitable material(s), including plastic, metal, or other suitable material, or a combination of suitable materials. An advantage of forming the enclosure 104 from plastic is that this may help to reduce the overall weight of the electronic device 100 and may avoid potential interference with wireless operations.

The electronic device 100 may also include a power source 134 to provide power to the processing element(s) 132, display 108, window button assembly 101, and other components. The power source 134 may include one or more batteries (e.g., lithium ion batteries), a cable to communicatively couple the electronic device 100 to an external power supply (e.g., wall outlet), or the like.

With continued reference to FIG. 3, the electronic device 100 may also include an I/O interface 140, including a communication antenna 110. The communication antenna 110 may be used to communicate with external devices such as accessories (e.g., headphones, speakers, gaming systems and controllers, wireless printers, cameras), computing equipment (e.g., servers, peer devices, router), and/or wireless networks. The communication antenna 110 may be any type of communication circuitry, including radio-frequency, optical, or infrared transceivers, and may support communications over any suitable wireless communications bands. The I/O interface 140 and the communication antenna 110 may be in connection with the processing element(s) 132, the memory component(s) 130, and/or one or more of the sensors 136.

Tuning now to FIG. 4, the window button assembly 101 is configured to provide both user input to the electronic device 100 and output information to the user. As one example, pressing the window button assembly 101 may initiate pairing communication with another device through the communication antenna 110 (e.g., Bluetooth, WiFi, or other wireless communication protocols) and/or provide feedback to the user through a feedback component 114 (e.g., a status indicator light such as an LED, an audio speaker, a vibratory output or other tactile method, etc.) that pairing is in progress and/or complete. In one suitable embodiment, the feedback component 114 may be formed from multiple LEDs, each of which displays a different color, or from a multicolor LED. As one example, the feedback component 114 may display a green light when pairing is complete, a yellow light when pairing is in progress, a red light when an error has occurred during pairing communication, or may not display a light when the electronic device 100 is off or if the window button assembly 101 has not been activated by the user. The feedback component 114 may display a light when the status of the electronic device 100 changes, at regular intervals, continuously, or at combinations of these and other times. As another example, pressing the window button assembly 101 may power the electronic device 100 on or off while providing similar feedback to the user. In some embodiments, the feedback component 114 may illuminate part of the button plank 102 once the window button assembly 101 is pressed by the user. In other embodiments, the feedback component 114 may provide tactile feedback to the user once the button plank 102 is depressed sufficiently to initiate the action associated with the window button assembly 101.

Figure 5:
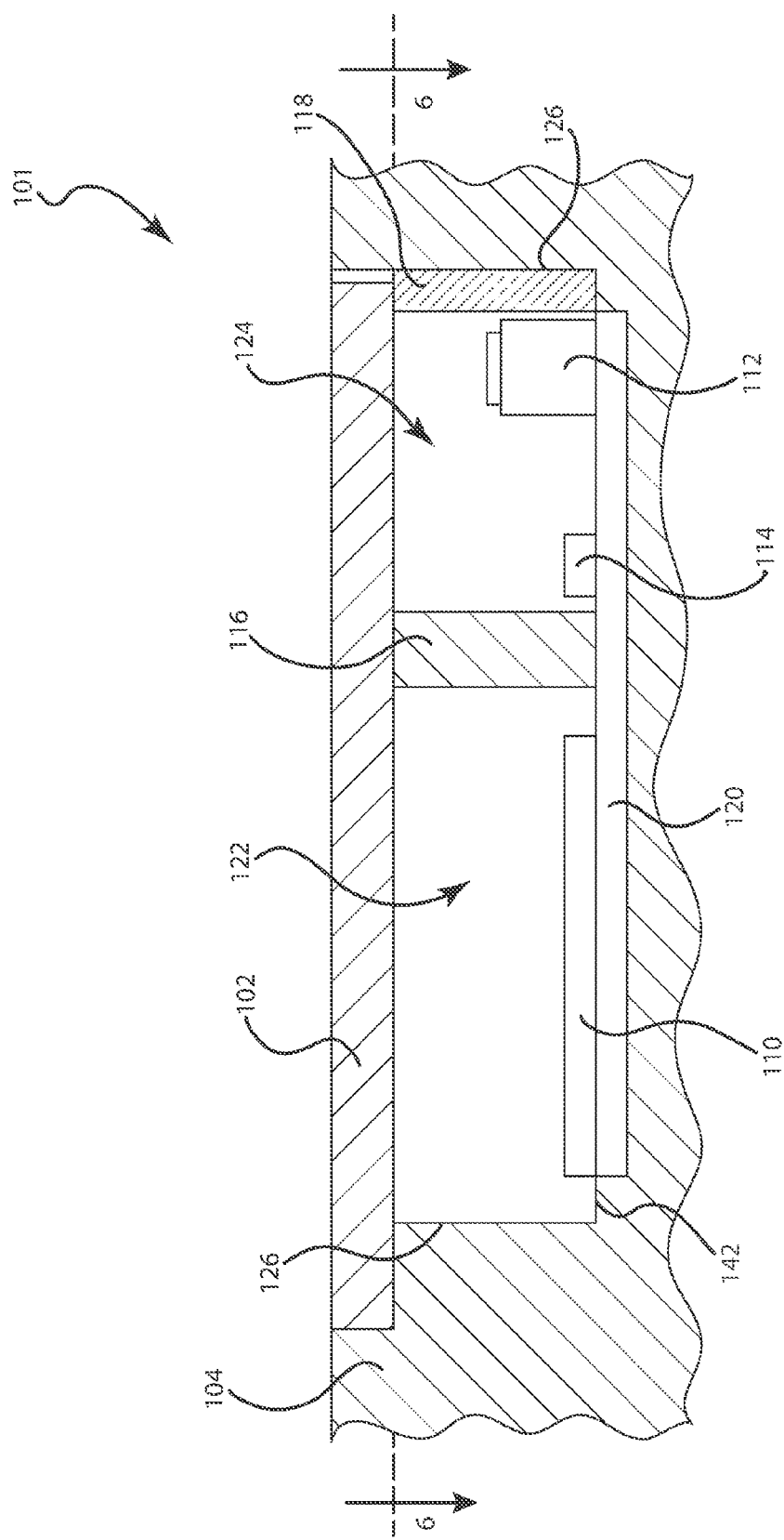
FIG. 5 is a cross-section view of the sample window button assembly taken along line 5-5 in FIG. 4.

Illustrative examples of the structure and components of the window button assembly 101 will now be discussed in more detail. FIG. 5 is a cross-section view of the window button assembly 101 taken along line 5-5 in FIG. 4. With reference to FIG. 5, in some embodiments the button plank 102 may cover the communication antenna 110, a switch component 112, and the feedback component 114. The button plank 102 may also hide other features behind the button plank 102. The button plank 102 may be made of any material, such as glass, that will both allow the button plank 102 to flex as described below and not shield the communication antenna 110 from receiving or transmitting signals properly. The switch component 112 may be any type of switch or sensor designed to detect input from the user, such as a force sensor, strain gauge, capacitive sensor, electrical contact sensor, mechanical switch or the like. The switch component 112, status indicator light 114, and communication antenna 110 may all be placed on a single circuit 120 behind the button plank 102, saving parts and costs associated with having separate component assemblies. Other embodiments, however, may have separate component assemblies in lieu of a single circuit 120. In FIG. 5, the communication antenna 110 may be housed in a communication cavity 122 defined by enclosure sidewalls 126, a bottom wall 142, and a cantilever post 116. The switch component 112 and feedback component 114 may be housed in a separate switch cavity 124 defined by the cantilever post 116, enclosure sidewalls 126, and the bottom wall 142. In some embodiments, the cantilever post 116 may be removed, and the communication cavity 122 and switch cavity 124 may form substantially one cavity.

Figure 6:
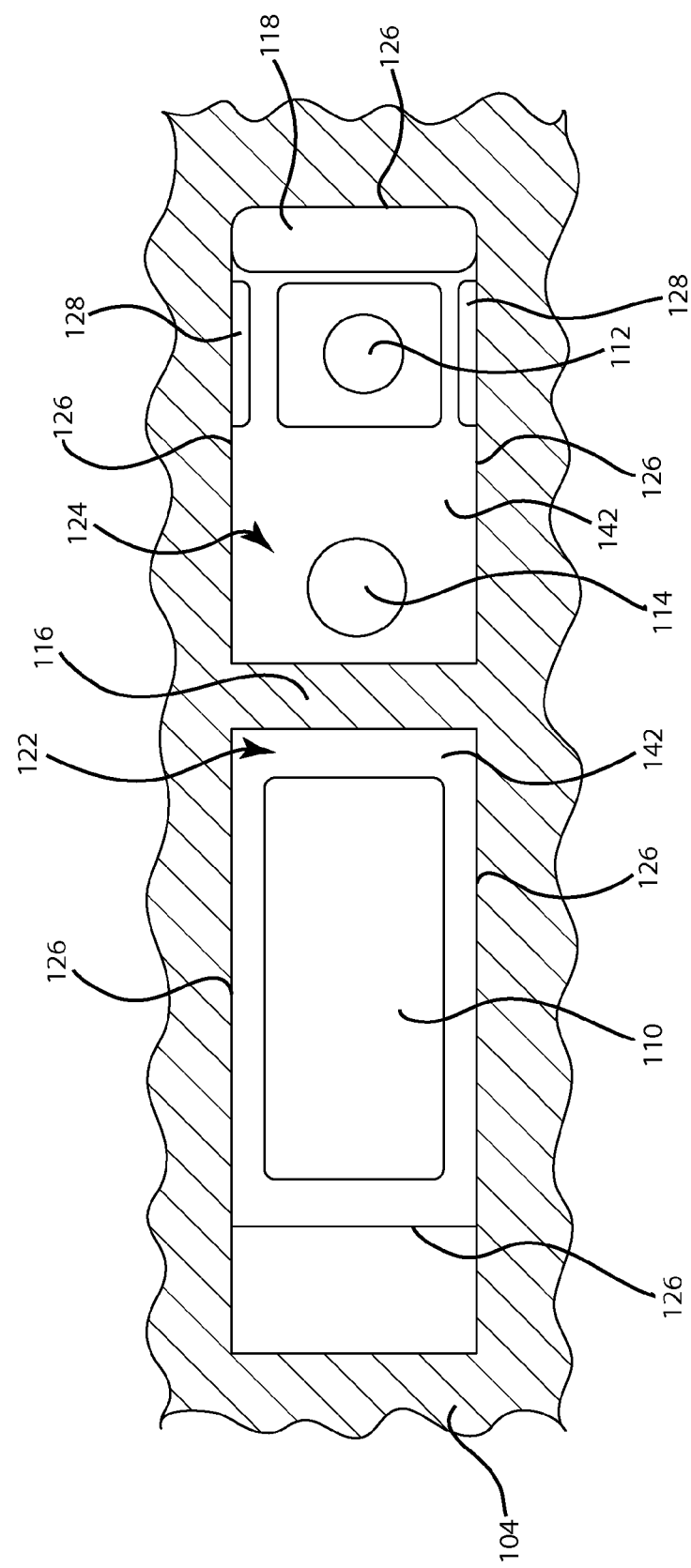
FIG. 6 is a cross-section view of the sample window button assembly taken along line 6-6 in FIG. 5.

Still with respect to FIG. 5, the button plank 102 may be attached to the enclosure 104 on one end, such as immediately adjacent to the communication cavity 122. The button plank 102 may also rest on, or be attached to, the cantilever post 116. Attachment of the button plank 102 to the enclosure 104 and/or the cantilever post 116 may be permanent (e.g., glue, epoxy, weld) or by a fastener (e.g., a screw). The cantilever post 116 may also be formed integrally with the button plank 102. The button plank 102 may be sufficiently flush against, and parallel to, the enclosure sidewall 126 opposite the attached end and immediately adjacent to the switch cavity 124. Accordingly, an extended area of the button plank 102 may be cantilevered over the switch cavity 124, allowing the button plank 102 to be bent sufficiently to activate the switch component 112 located in the switch cavity 124. This switch action may then perform an action associated with the switch component 112, such as turning the electronic device 100 on or off or initiating pairing communication with another device through the communication antenna 110. The feedback component 114 may then be activated, which may be visible to the user from the exterior of the button plank 102. A seal 118 may be fixed to the enclosure sidewalls 126, substantially under the cantilevered end of the button plank 102, to prevent contamination from entering the switch cavity 124. The seal 118 may be placed entirely around the perimeter of the cantilevered end of the button plank 102. In other embodiments, and as shown in FIG. 6, the seal may be placed simply at the furthermost end of the cantilevered button plank 102. The seal 118 may be resilient but flexible to compress when the button plank 102 is depressed by a user to activate the switch component 112.

Figure 7:
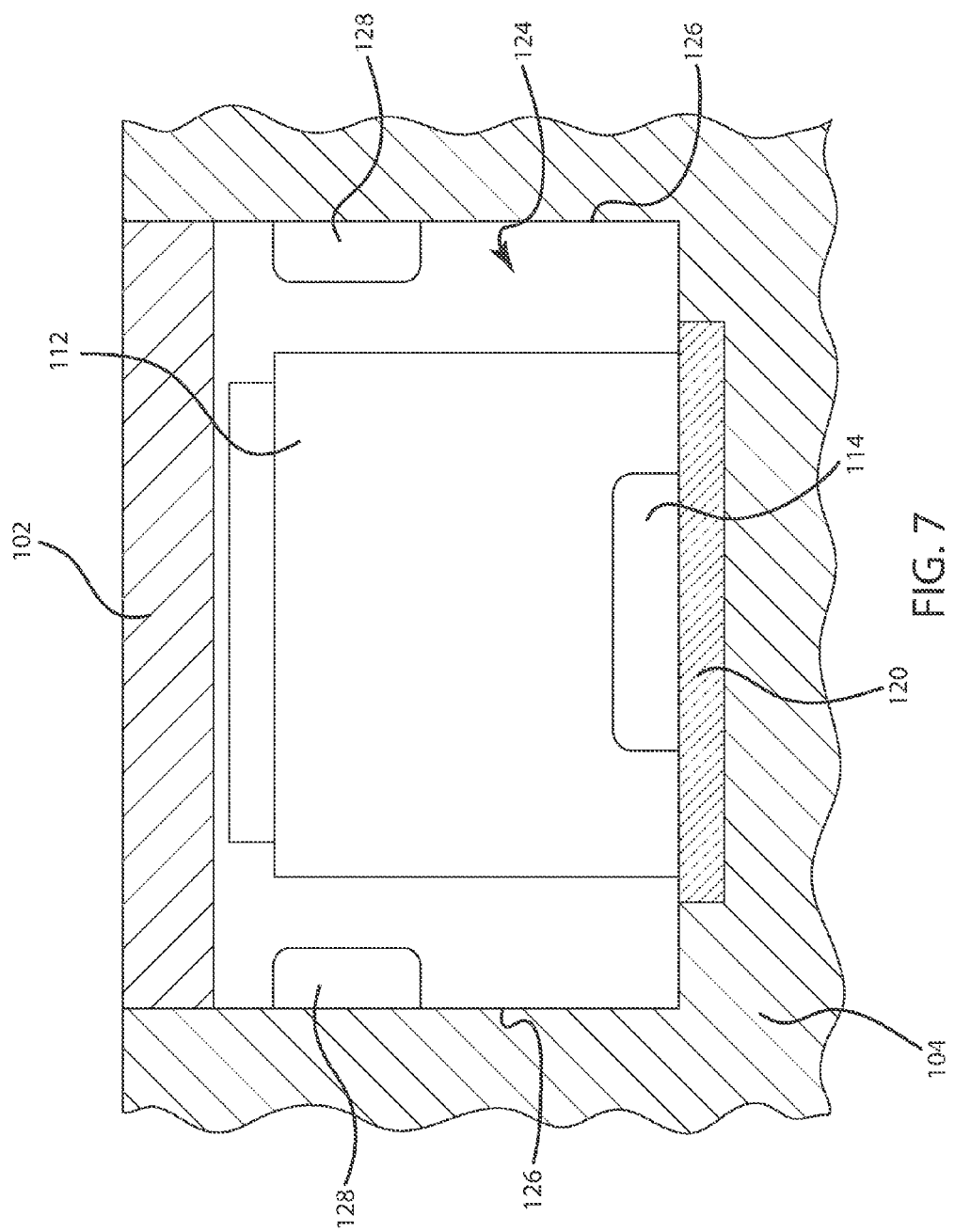
FIG. 7 is a cross-section view of the sample window button assembly taken along ling 7-7 in FIG. 4.

The switch component 112 may be pressed against specific surface features of the enclosure 104 that are hidden behind the button plank 102 in order to actuate the switch. The enclosure features may also form mechanical stops 128, as shown in FIGS. 6 and 7, to prevent the button plank 102 from over deflecting and breaking. The mechanical stops 128 may be formed integrally with the enclosure sidewalls 126 or may be attached to the enclosure sidewalls 126 using temporary or permanent fasteners and/or adhesive or using any other suitable mounting arrangements. In alternate embodiments, the mechanical stops 128 may be formed integrally with the bottom wall 142 or may be attached to the bottom wall 142 using temporary or permanent fasteners and/or adhesive or using any other suitable mounting arrangements.

Figure 8:
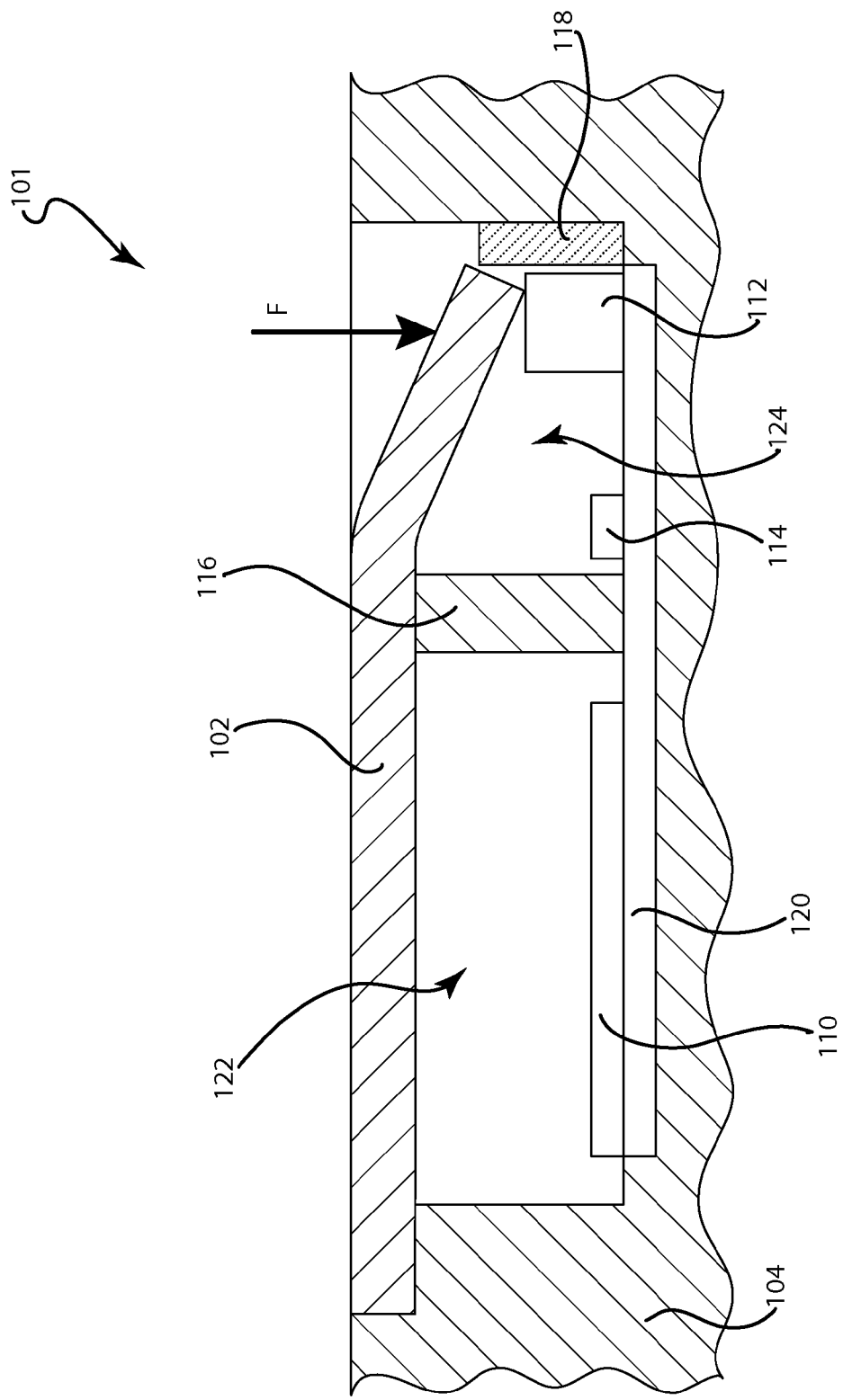
FIG. 8 is a cross-section view of the sample window button assembly taken along line 7-7 in FIG. 4, showing deflection of a button plank caused by a force of a user.

FIG. 8 depicts a side view of the button plank 102, similar to the view of FIG. 5, except showing the button plank in a deflected state. As exemplified in FIG. 8, the cantilevered portion of the button plank 102 extending past the cantilever post 116 and covering the switch cavity 124 may deflect inward sub-flush of the enclosure 104 when a force is applied by the user to the cantilevered portion of the button plank 102. The button plank 102 may continue to deflect sub-flush until sufficient contact is made to activate the switch component 112. The distance between the button plank 102 and the switch component 112 may be dictated by the type of material used to form the button plank 102. For example, a button plank 102 made of plastic or some other relatively flexible material may be able to deflect greater distances. A button plank 102, however, made of glass or some other relatively rigid material may require shorter deflection distances and tighter tolerances. Once the switch component 112 is activated, the communication antenna 110 (or any other suitable component) may power on and the feedback component 114 may indicate to the user the status of the communication antenna 110 and/or device pairing. In other embodiments, once the switch component 112 is activated, any action associated with the switch action may be initiated, such as powering the electronic device 100 on or off or performing any other action associated with the switch component 112. As illustrated in FIG. 8, the seal 118 will compress but still maintain sufficient contact with the button plank 102 and the enclosure 104 to prevent contamination or debris from entering the switch cavity 124.

Figure 9:
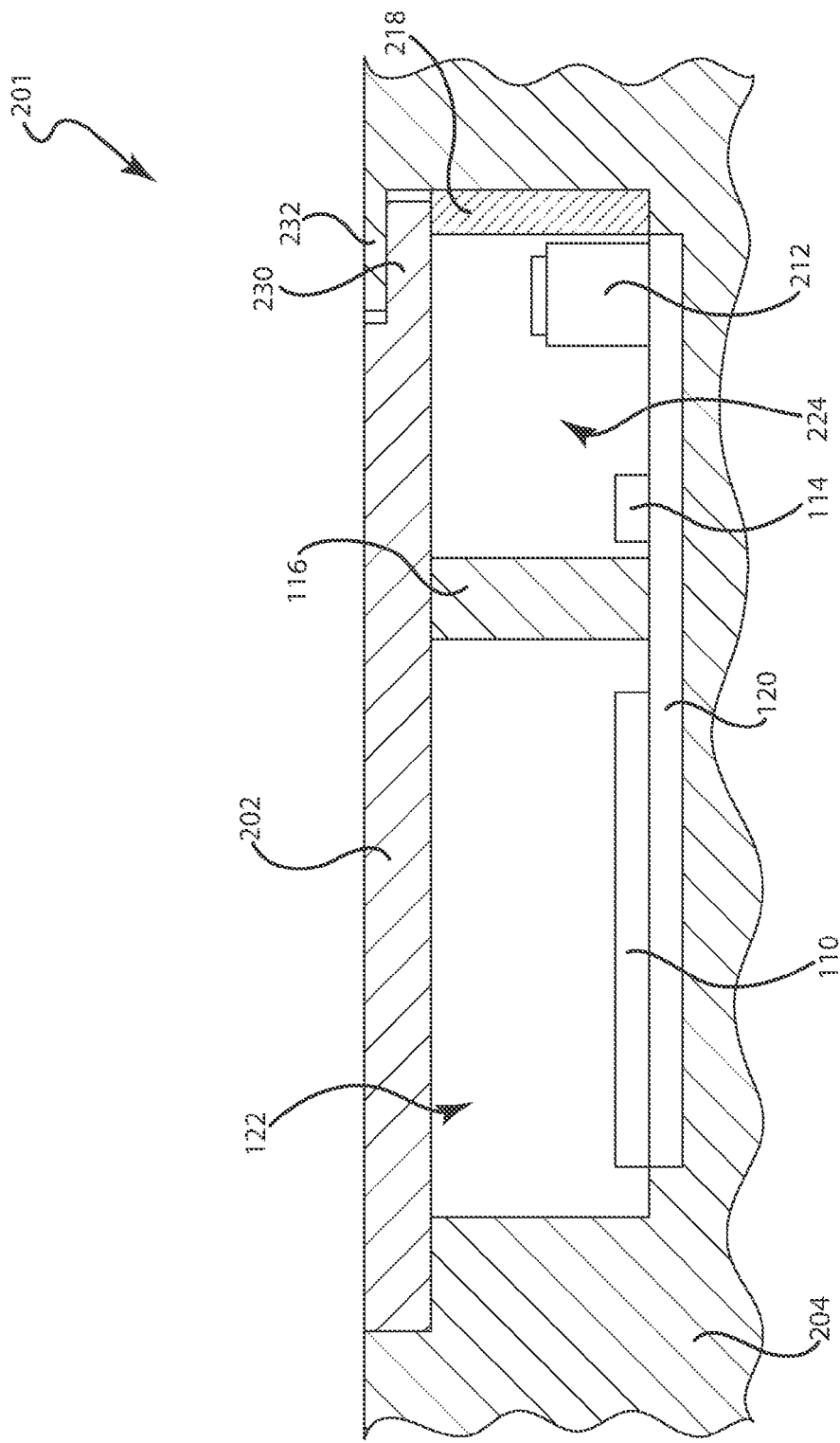
FIG. 9 is a cross-section view of a second embodiment of the sample window button assembly taken along line 7-7 in FIG. 4.

FIG. 9 depicts a side cross-sectional view of another embodiment of the invention. FIG. 9 is a cross-section view of an alternate window button assembly 201 taken along line 5-5 in FIG. 4. The window button assembly 201 is substantially similar to the window button assembly 101 depicted in FIGS. 5-8 and discussed above, except a cantilevered portion of a button plank 202 over a switch cavity 224 interacts with an enclosure 204 in a different manner. With reference to FIG. 9, the button plank 202 may form a button lip 230 that interacts with a corresponding overhanging enclosure prong 232 formed substantially with, or attached substantially to, the enclosure 204. The interaction between the button lip 230 of the window button 202 and the overhanging enclosure prong 232 of the enclosure 204 allows the top surface of the button plank 202 to remain substantially flush with the enclosure 204 and prevents the button plank 202 from deflecting outward above-flush of the enclosure 204. This also allows the seal 218 to exert greater amounts of pressure to the underside of the button plank 202 and produce a better seal to prevent debris and contamination from entering the switch cavity 224. The increased pressure exerted by the seal 218 may also provide better feedback to the user.

Figure 10:
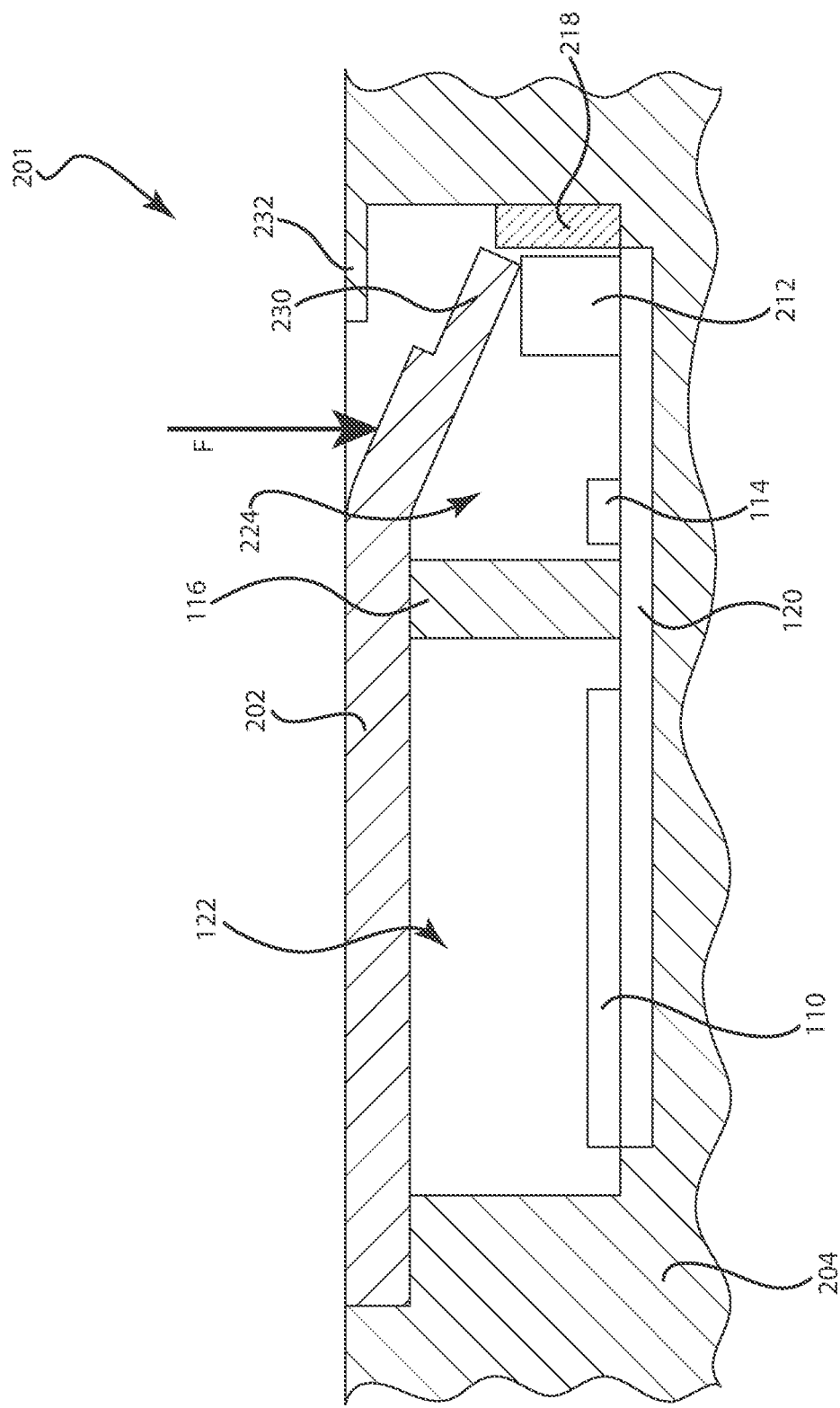
FIG. 10 is a cross-section view of the second embodiment of the sample window button assembly taken along line 7-7 in FIG. 4, showing deflection of a button plank caused by a force of a user.

FIG. 10 depicts the button plank 202 of FIG. 9 in a deflected state. Deflection of the alternate button plank 202 is substantially similar to the deflection of the button plank 102 depicted in FIG. 8 and discussed above. The button plank 202 may deflect inward sub-flush of the enclosure 204 when a force is applied by the user to the cantilevered portion of the button plank 202. The button plank 202 may continue to deflect sub-flush until sufficient contact is made to activate a switch component 212. In some embodiments, the switch component 212 may be located between the button lip 230 and the overhanging enclosure prong 232. When the button plank 202 is deflected, the switch component 212 may activate based on the distance between the button lip 230 and the overhanging enclosure prong 232.

Figure 11:
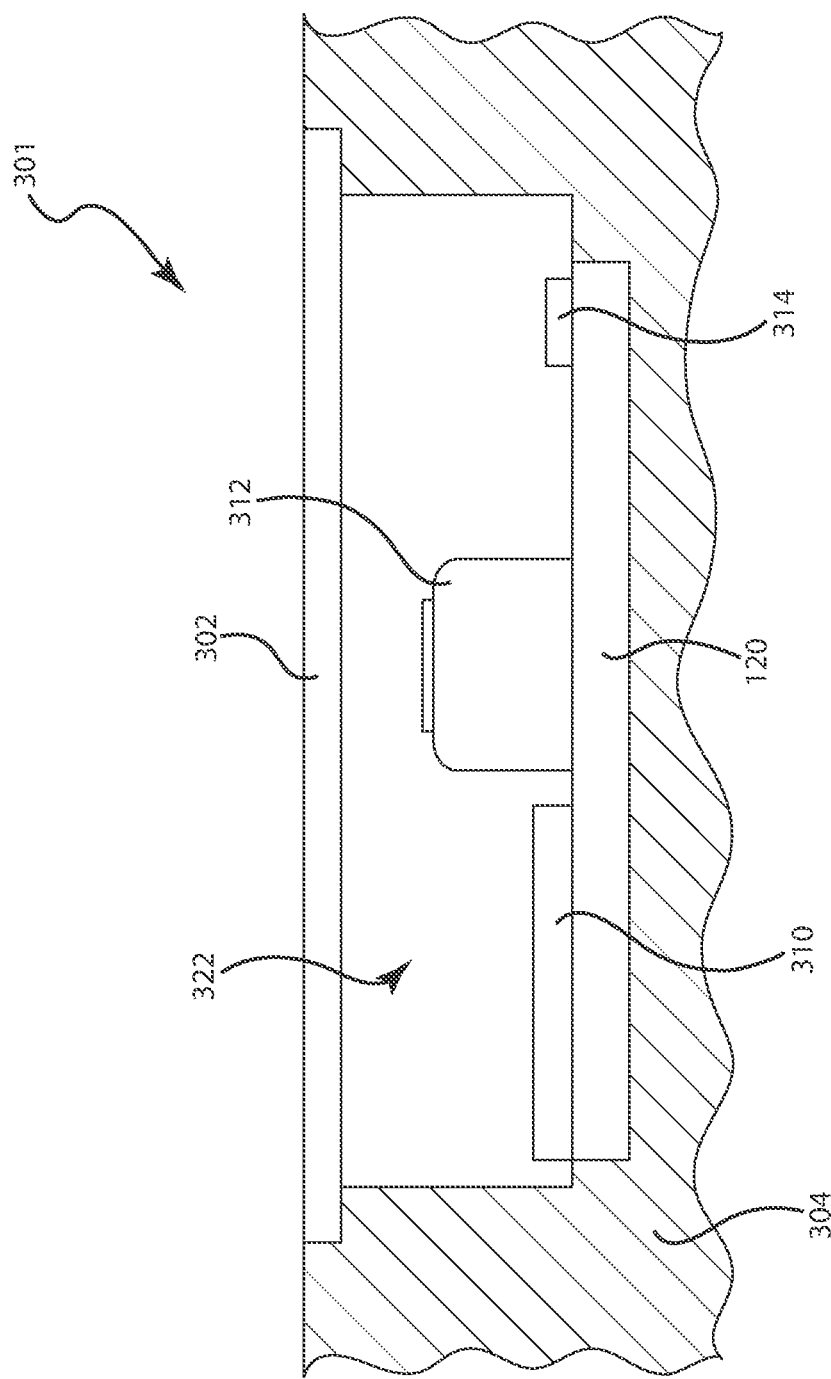
FIG. 11 is a cross-section view of a third embodiment of the sample window button assembly taken along line 7-7 in FIG. 4.

FIG. 11 depicts another embodiment of the invention. FIG. 11 is a cross-section view of an alternate window button assembly 301 taken along line 5-5 in FIG. 4. The window button assembly 301 is substantially similar to the window button assembly 101 depicted in FIGS. 5-8 and discussed above, except the button plank 302 may be configured as a double cantilevered beam with both ends of a button plank 302 attached to the enclosure 304. With reference to FIG. 11, a communication antenna 310, feedback component 314, and switch component 312 may be housed in substantially one cavity 322.

Figure 12:
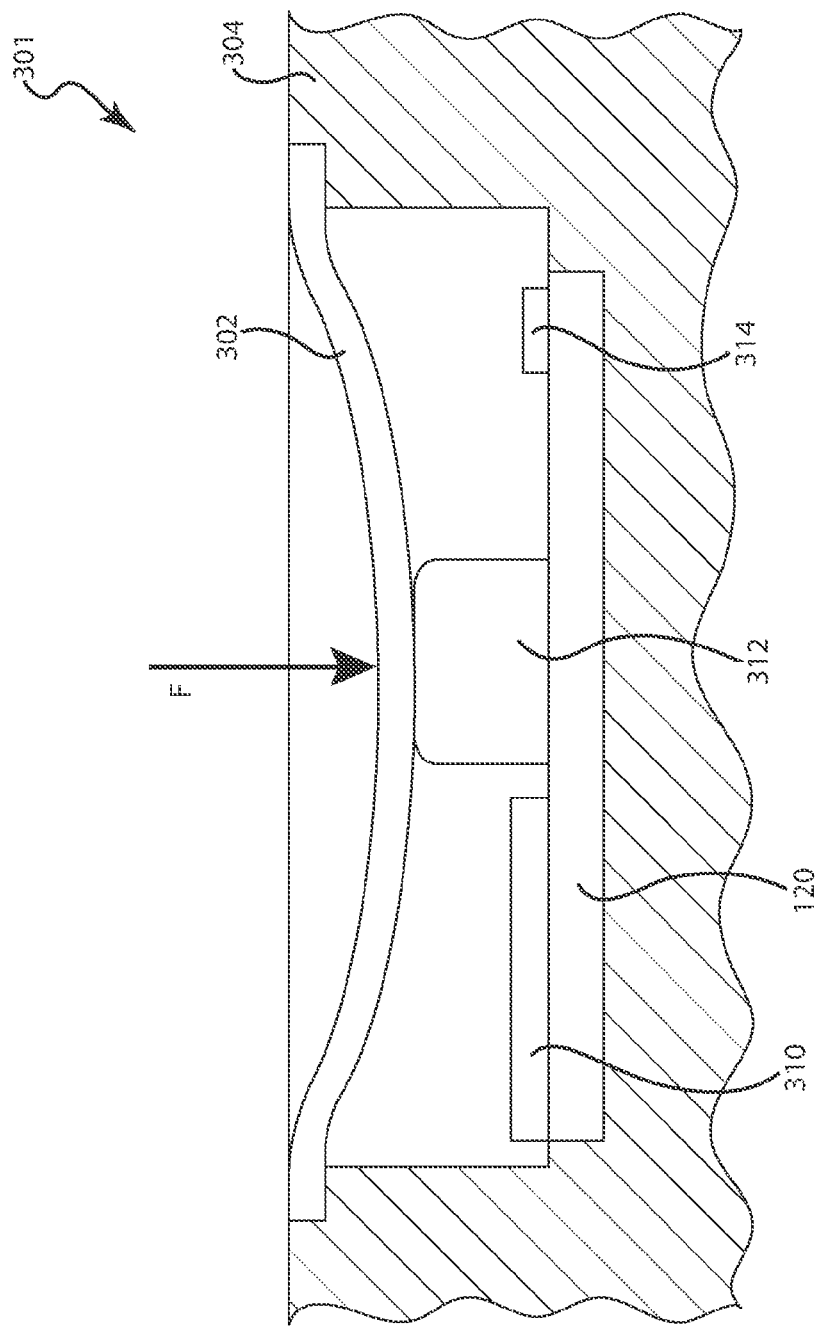
FIG. 12 is a cross-section view of the third embodiment of the sample window button assembly taken along line 7-7 in FIG. 4, showing deflection of a button plank caused by a force of a user.

FIG. 12 depicts the button plank 302 in a deflected state. As represented in FIG. 12, the button plank 302 may deflect inward sub-flush of the enclosure 304 when a force is applied by the user to the button plank 302. Because both ends of the button plank 302 are attached to the enclosure 304, deflection of the button plank 302 may be greatest in substantially the center of the button plank 302. Accordingly, the switch component 312 may be located under the button plank 302 where the greatest deflection will likely occur.

The foregoing description has broad application. For example, while examples disclosed herein may focus on discrete embodiments, it should be appreciated that the concepts disclosed herein may be combined together and implemented in a single structure. Additionally, although the various embodiments may be discussed with respect to glass, the techniques and structures may be implemented using substantially any other type of suitable material. Accordingly, the discussion of any embodiment is meant only to be an example and is not intended to suggest that the scope of the disclosure, including the claims, is limited to these examples.

What is claimed is:

1. An electronic device, comprising:
   an enclosure;
   a processor; and
   a window button assembly in communication with the processor and connected to the enclosure, the window button assembly comprising:
      a switch component disposed in a cavity in the enclosure;
      a communication antenna disposed in the cavity and in communication with the switch component;
      a feedback component disposed in the cavity and in communication with the switch component; and
      a button plank disposed over the cavity;
      wherein
         a first portion of the button plank covers the communication antenna and an end of the first portion is attached to the enclosure; and
         a second portion of the button plank is cantilevered over the switch component and deflection of the second portion of the button plank activates the switch component and activation of the switch component activates the communication antenna and the feedback component.

2. The electronic device as in claim 1, further comprising a display, wherein the display is in communication with the processor and is connected to the enclosure.

3. The electronic device as in claim 1, wherein the feedback component is a status indicator light.

4. The electronic device as in claim 3, wherein the status light indicator indicates a status of a device pairing operation using the communication antenna.

5. The electronic device as in claim 1, wherein the button plank is formed integrally with the enclosure.

6. The electronic device as in claim 1, wherein the button plank is made of glass.

7. The electronic device as in claim 1, further comprising a seal fixed to a sidewall of the cavity substantially under an end of the second portion of the button plank.

8. The electronic device as in claim 1, further comprising one or more mechanical stops disposed in the cavity to prevent over-deflection of the second portion of the button plank.

9. The electronic device as in claim 1, wherein an end of the second portion of the button plank includes a button lip that interacts with a corresponding overhanging enclosure prong.

10. The electronic device as in claim 1, wherein the switch component, the communication antenna, and the feedback component are coupled to a circuit.

11. An electronic device, comprising:
    an enclosure; and
    a window button assembly connected to the enclosure, the window button assembly comprising:
       a switch component disposed in a cavity in the enclosure;
       a second component disposed in the cavity and in communication with the switch component;
       a feedback component disposed in the cavity and in communication with the switch component; and
       a button plank disposed over the cavity;
       wherein
          a first portion of the button plank covers the second component and an end of the first portion is attached to the enclosure; and
          a second portion of the button plank is cantilevered over the switch component and deflection of the second portion activates the switch component and activation of the switch component activates the second component and initiates an action by the feedback component.

12. The electronic device as in claim 11, wherein the cavity comprises a switch cavity and a second cavity and:
    the feedback component and the switch component are positioned in the switch cavity formed below the second portion of the button plank, the switch cavity being defined by a cantilever post, an enclosure sidewall and a bottom wall; and
    the second component is positioned in the second cavity formed below the first portion of the button plank, the second cavity being defined by the cantilever post, the bottom wall, and another enclosure sidewall.

13. The electronic device as in claim 11, wherein the feedback component comprises a status indicator light.

14. The electronic device as in claim 11, wherein the second component comprises an antenna.

15. The electronic device of claim 11, further comprising a seal fixed to a sidewall of the cavity substantially under an end of the second portion of the button plank.

16. The electronic device as in claim 11, further comprising one or more mechanical stops disposed in the cavity to prevent over-deflection of the second end of the button plank.

17. The electronic device as in claim 11, wherein an end of the second portion of the button plank includes a button lip that interacts with a corresponding overhanging enclosure prong.

18. The electronic device as in claim 11, wherein the switch component, the second component, and the feedback component are coupled to a circuit.

19. An electronic device, comprising:
an enclosure; and
a window button assembly connected to the enclosure, the window button assembly comprising:
- a switch component disposed in a cavity in the enclosure;
- a second component disposed in the cavity and in communication with the switch component;
- a feedback component disposed in the cavity and in communication with the switch component; and
- a button plank disposed over the cavity and having a first end attached to the enclosure and a second end attached to the enclosure and deflection of the button plank activates the switch component disposed below the button plank and activation of the switch component initiates a first action by the second component and initiates a second action by the feedback component.

20. The electronic device as in claim 19, wherein the feedback component comprises a status indicator light.

21. The electronic device as in claim 19, wherein the second component in communication with the switch component comprises an antenna.

22. The electronic device as in claim 19, wherein the switch component, the second component, and the feedback component are coupled to a circuit.

* * * * *